US 11,385,117 B2

(12) United States Patent
Storrie (10) Patent No.: US 11,385,117 B2
(45) Date of Patent: Jul. 12, 2022

(54) TIRE PRESSURE MONITORING MODULE WITH THRU-VALVE CONSTRUCTION

(71) Applicant: Sensata Technologies, Inc., Attleboro, MA (US)

(72) Inventor: Ryan Storrie, Toomebridge (GB)

(73) Assignee: Sensata Technologies, Inc., Attleboro, MA (US)

( * ) Notice: Subject to any disclaimer, the term of this patent is extended or adjusted under 35 U.S.C. 154(b) by 145 days.

(21) Appl. No.: 16/778,739

(22) Filed: Jan. 31, 2020

(65) Prior Publication Data

US 2021/0239558 A1 Aug. 5, 2021

(51) Int. Cl.
*B60C 23/04* (2006.01)
*G01L 17/00* (2006.01)

(52) U.S. Cl.
CPC .......... *G01L 17/00* (2013.01); *B60C 23/0496* (2013.01)

(58) Field of Classification Search
CPC ... B60C 13/04; B60C 15/0036; B60C 15/024; B60C 17/041; B60C 17/066; B60C 2007/005; B60C 2009/0071; B60C 2009/2022; B60C 2011/0358; B60C 2011/1254; B60C 2017/068; B60C 2200/06; B60C 2200/12; B60C 2200/14; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027;
(Continued)

(56) References Cited

U.S. PATENT DOCUMENTS 6,546,982 B1 4/2003 Brown et al.
6,805,001 B2 * 10/2004 Luce .................... B60C 23/0494
73/146.3
(Continued)

FOREIGN PATENT DOCUMENTS

CN 107433827 12/2017
DE 202007009443 U1 9/2007
(Continued)

OTHER PUBLICATIONS

International Search Report & Written Opinion, PCT/US2020/063122, dated Feb. 11, 2021, 11 pages.
(Continued)

*Primary Examiner* — Andre J Allen
(74) *Attorney, Agent, or Firm* — Mark H. Williams (57) ABSTRACT

A TPMS module includes a sensor body with two arcuate surfaces adjacent the opening. A tire valve includes two arcuate portions and a distal portion. A plurality of gripping teeth are disposed on the valve arcuate portions. The valve distal portion is provided in the sensor body opening and arranged such that the valve arcuate portions couple to the sensor body arcuate surfaces. The valve is coupled to the sensor body by the interaction of a seat and a grommet such that the gripping teeth interact with the sensor body arcuate surfaces to maintain an orientation of the valve with respect to the sensor body.

20 Claims, 7 Drawing Sheets

(58) Field of Classification Search
CPC ............ G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06
USPC ................................. 73/146–146.8
See application file for complete search history.

(56) References Cited

U.S. PATENT DOCUMENTS

| | | | |
|---|---|---|---|
| 7,021,133 | B1 | 4/2006 | Hsu |
| 8,234,919 | B2 | 8/2012 | Arnaldo et al. |
| 2003/0066343 | A1 | 4/2003 | Fischer et al. |
| 2003/0079537 | A1* | 5/2003 | Luce ................. B60C 23/0494 73/146 |
| 2004/0261510 | A1 | 12/2004 | Schulze |
| 2005/0087007 | A1* | 4/2005 | Uleski ............... B60C 23/0494 73/146 |
| 2005/0132792 | A1 | 6/2005 | Lemense et al. |
| 2007/0257666 | A1 | 11/2007 | Laure et al. |
| 2007/0295076 | A1 | 12/2007 | Blossfeld et al. |
| 2008/0276995 | A1* | 11/2008 | Ray .................... B60C 23/0408 137/227 |
| 2013/0233399 | A1* | 9/2013 | Choe .................... B60C 29/02 137/15.01 |
| 2014/0352420 | A1 | 12/2014 | Brusarosco et al. |
| 2015/0343861 | A1* | 12/2015 | Gosi .................... F16K 15/205 137/227 |
| 2017/0284786 | A1 | 10/2017 | Dudar et al. |
| 2018/0333997 | A1* | 11/2018 | Vargus ................ B60C 29/02 |
| 2019/0217672 | A1 | 7/2019 | Li |
| 2020/0254831 | A1* | 8/2020 | Yamada .............. B60C 23/0494 |

FOREIGN PATENT DOCUMENTS

| | | | | |
|---|---|---|---|---|
| DE | 102012216576.2 | | 5/2014 | |
| EP | 1433625 | A1 | 10/2003 | |
| EP | 1433625 | A1 | 6/2004 | |
| EP | 2777958 | | 9/2014 | |
| EP | 3865319 | A1 * | 8/2021 | ......... B60C 23/0494 |
| FR | 2907048 | A1 | 4/2008 | |
| WO | WO-2008055944 | A1 * | 5/2008 | ......... B60C 23/0408 |
| WO | WO-2010114187 | A1 * | 10/2010 | ......... B60C 23/0494 |
| WO | WO-2014108926 | A1 * | 7/2014 | ......... B60C 23/0498 |
| WO | 2017/150396 | | 9/2017 | |
| WO | WO-2018122924 | A1 * | 7/2018 | ......... B60C 23/0494 |

OTHER PUBLICATIONS

Great Britain International Search Report for Application No. GB1910564.2; dated Jan. 15, 2020; 3 pages.

* cited by examiner

TIRE PRESSURE MONITORING MODULE WITH THRU-VALVE CONSTRUCTION

FIELD OF THE INVENTION

The disclosure relates to a Tire Pressure Monitoring System (TPMS) module.

BACKGROUND OF THE INVENTION

As is known, a TPMS module includes a housing within which a pressure measuring device and a transmission device are provided. In known systems, for example, as shown in U.S. Pat. No. 8,234,919, the pressure measuring housing is attached to a tire valve and installed inside the tire to be monitored. The housing is shaped to be adjacent to, i.e., rest on, an interior rim well.

It is important that the housing be adjacent the interior wheel rim well for reliability purposes. An issue arises, however, with respect to the differing geometries of the interior rim wells of various wheels and/or rims. In addition, there are differently shaped tire valves for various tire, rim and wheel combinations. Accordingly, the valve and rim/wheel geometries may combine to prevent the TPMS module from being able to contact the interior rim well. Further, a bolt-in TPMS module must meet customer-specified residual torque specifications in order to resist sensor clocking and/or lift during high centrifugal loading.

A known solution to the foregoing issues implements a variable angle TPMS sensor module that can adjust the angle of the module with respect to the wheel rim. A metal-to-metal contact bolt joint is typically used in order to resist the static and dynamic loads applied to the sensor during its time in service.

What is needed, however, is a better tire pressure measuring assembly to address the shortcomings of known systems.

SUMMARY

In one aspect of the present disclosure, there is a tire monitoring module, comprising: a sensor body having an opening defined therein and receiving surfaces provided adjacent the opening; and a valve comprising: a distal portion; a coupling portion; a plurality of arcuate surfaces provided on the coupling portion; and a set of gripping structures disposed on coupling portion arcuate surface. The valve is provided in the sensor body opening and arranged such that the gripping structures couple to the sensor body arcuate receiving surfaces to maintain a fixed relationship of the valve to the sensor body.

In one aspect, each set of gripping structures comprises a plurality of gripping teeth. In one aspect, each gripping tooth in the plurality of gripping teeth comprises a linear protrusion extending from the arcuate surface. In one aspect, the linear protrusions on the tab arcuate surfaces are parallel to one another and are equidistantly distributed.

In one aspect, the gripping structures deform the sensor body arcuate receiving surfaces and engage therewith.

In another aspect of the present disclosure there is a tire monitoring module, comprising: a sensor body having an opening defined therein and two arcuate receiving surfaces provided adjacent the opening; a valve having a distal portion and a coupling portion; a plurality of opposed arcuate surfaces provided on the coupling portion; and a plurality of gripping teeth disposed on the arcuate surface. The valve is provided in the sensor body opening and arranged such that the gripping teeth on the coupling portion arcuate surfaces couple to the sensor body arcuate receiving surfaces.

BRIEF DESCRIPTION OF THE DRAWINGS

One or more aspects of the present disclosure are discussed below with reference to the accompanying Figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, however, not every component may be labeled in every drawing. The Figures are provided for the purposes of illustration and explanation and are not intended to be limiting. In the Figures.

DETAILED DESCRIPTION

In the following detailed description, numerous specific details are set forth in order to provide a thorough understanding of the aspects and implementations of the present disclosure. It will be understood by those of ordinary skill in the art that these may be practiced without some of the specific details that are set forth herein. In some instances, well-known methods, procedures, components and structures may not have been described in detail so as not to obscure the details of the implementations of the present disclosure.

One known TPMS with a variable angle module includes a metal insert embedded within a polymer enclosure. The use of such an insert, however, increases the part count which, in turn, increases the unit cost and the manufacturing complexity.

Generally, various aspects of the present disclosure provide for, among other aspects, a TPMS module with mounting features that are adjustable through a wide range of angles. Advantageously, there is no need for an insert component, as in known systems and, therefore, complexity and cost are reduced. Further, as will be described below, aspects of the present disclosure include a valve design that loads directly onto the seat that contains a seal/grommet structure. Further, a sensor housing can be positioned on an extensive range of wheel rim/valve combinations because of the presence of a "toothed geometry" that will grip the enclosure and hold it in place, effectively resisting centrifugal forces to which it is subjected.

Figure 1:
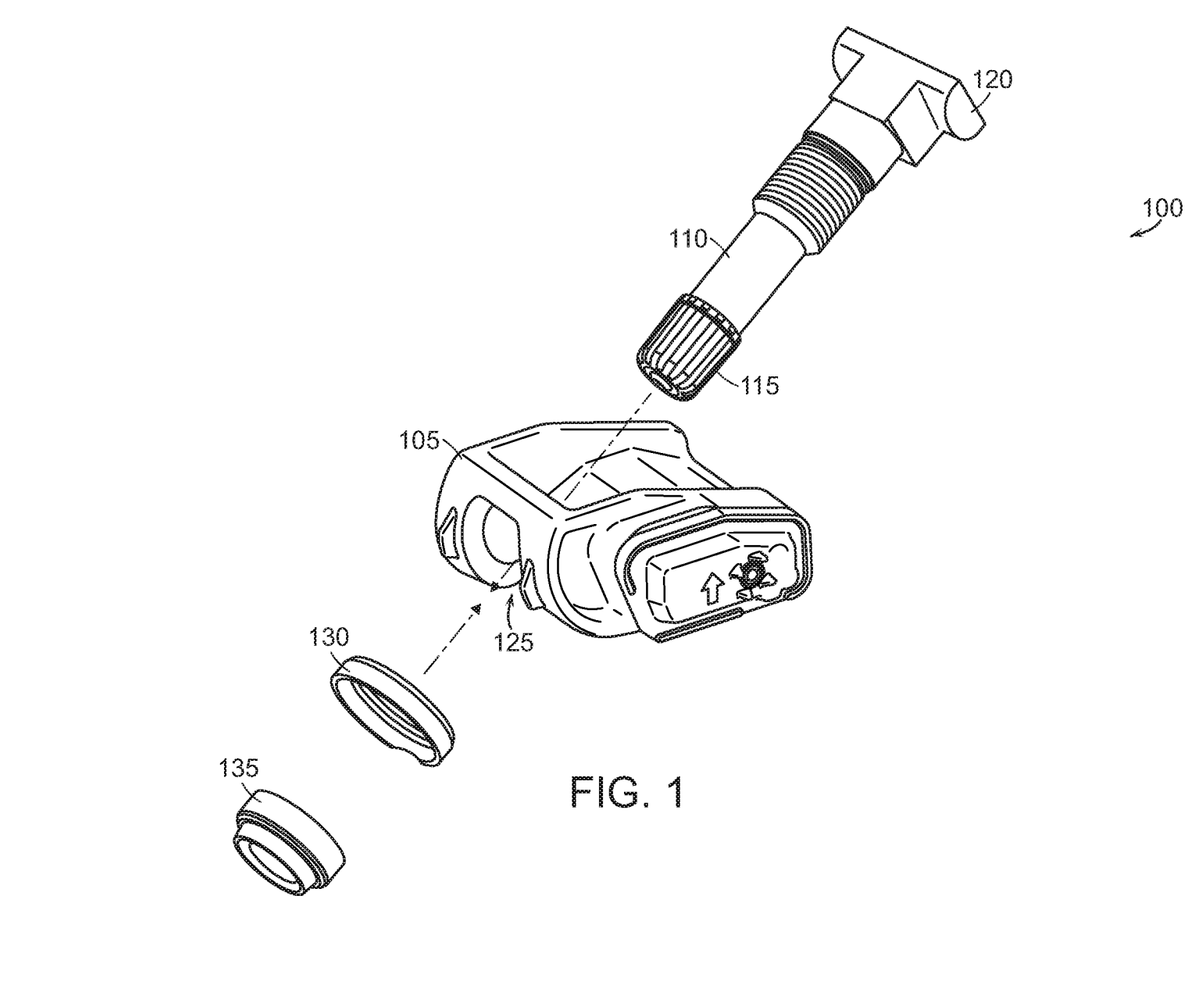
FIG. 1 is an exploded view of a TPMS module in accordance with an aspect of the present disclosure.

Referring now to FIG. 1, there is presented an exploded view of a TPMS module 100, in accordance with one aspect of the present disclosure, that includes a sensor body 105 and a valve 110. The sensor body 105, as is known, includes circuitry and devices for measuring tire characteristics such as pressure, temperature and the like and for transmitting those measurements and is made of, in one non-limiting example, plastic nylon. The valve 110 is made of aluminum, similar to known valves, and provides a fluid connection for filling a tire, for example, with air. The valve 110 includes a valve stem portion 115 at a distal end and a coupling portion 120 at a proximal end. The structure of the coupling portion 120 will be described below in more detail.

Figure 2:
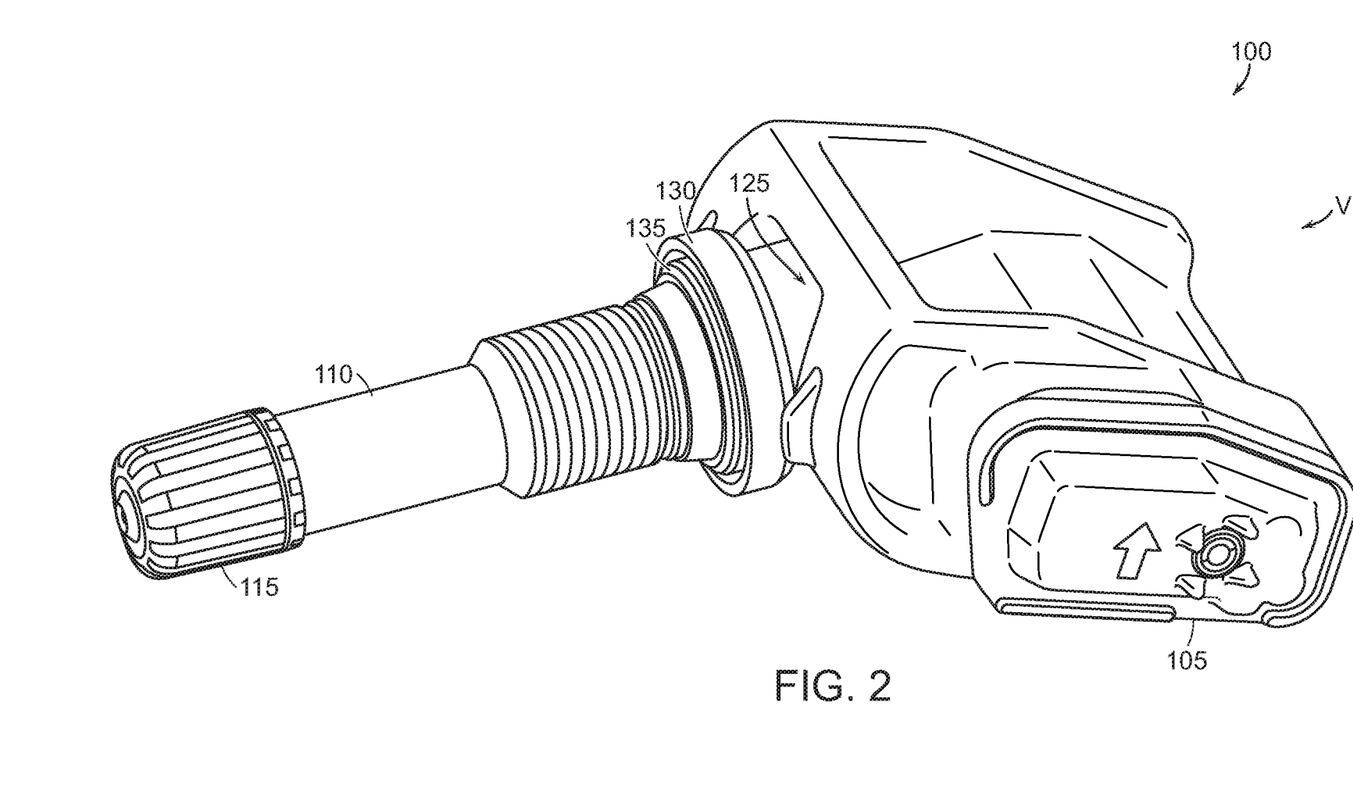
FIG. 2 is a perspective view of the TPMS module of FIG. 1 when assembled.

The valve stem portion 115 is positioned in an opening 125 of the sensor body 105, as shown. A seat 130 and a grommet 135 are then positioned to couple the valve 110 to the sensor body 105. In one aspect, the grommet 135 is press-fit or stretched around the valve 110 into the seat 130 to hold the assembly together as is shown in FIG. 2. Advantageously, the grommet 135 and the seat 130 can be separated from one another if necessary. Further, in an alternative embodiment of the present disclosure, the grommet 135 can be overmolded around the valve and into the seat 130.

Figure 3:
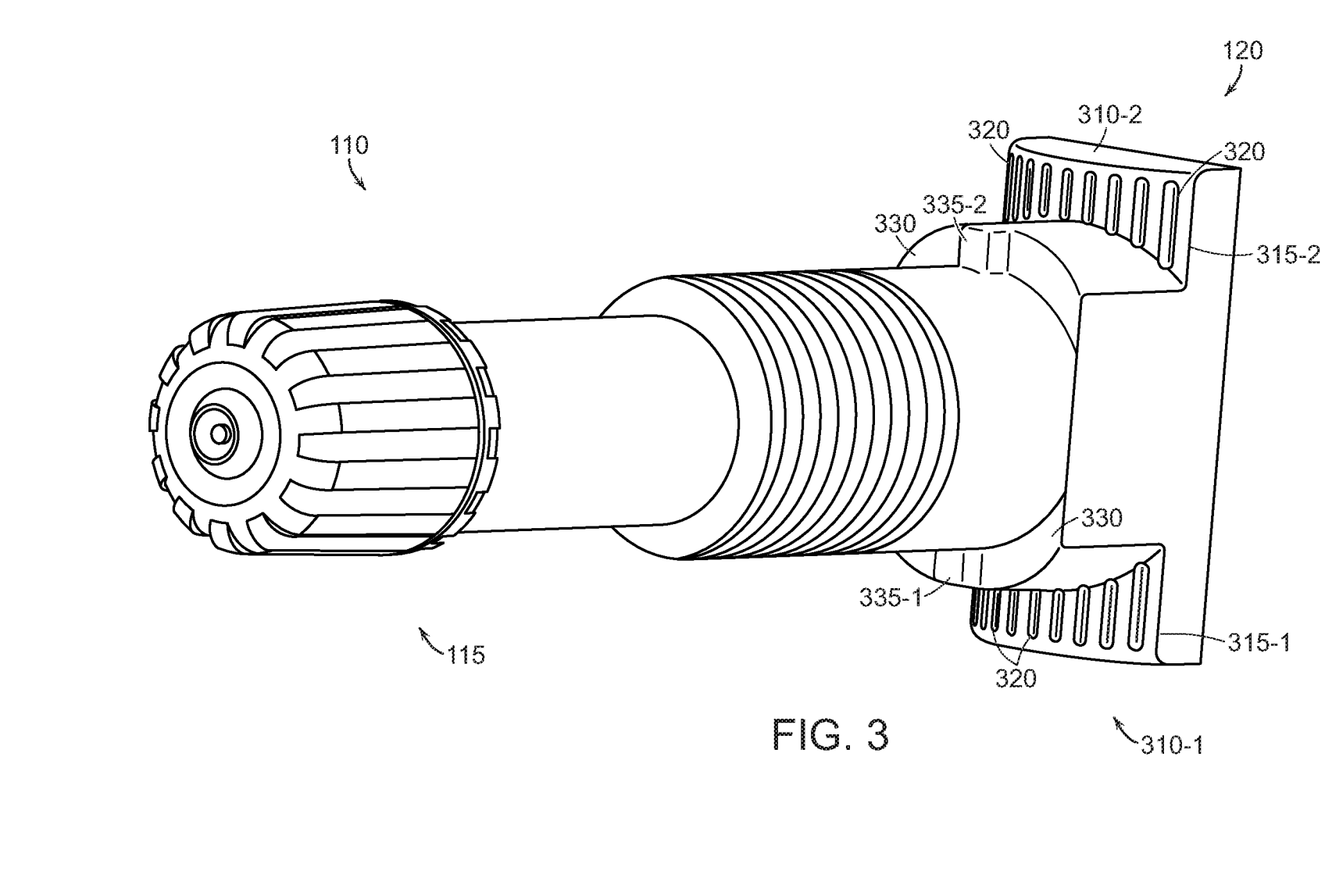
FIG. 3 is a perspective view of a valve component of the TPMS module in accordance with an aspect of the present disclosure.
Figures 4, 5:
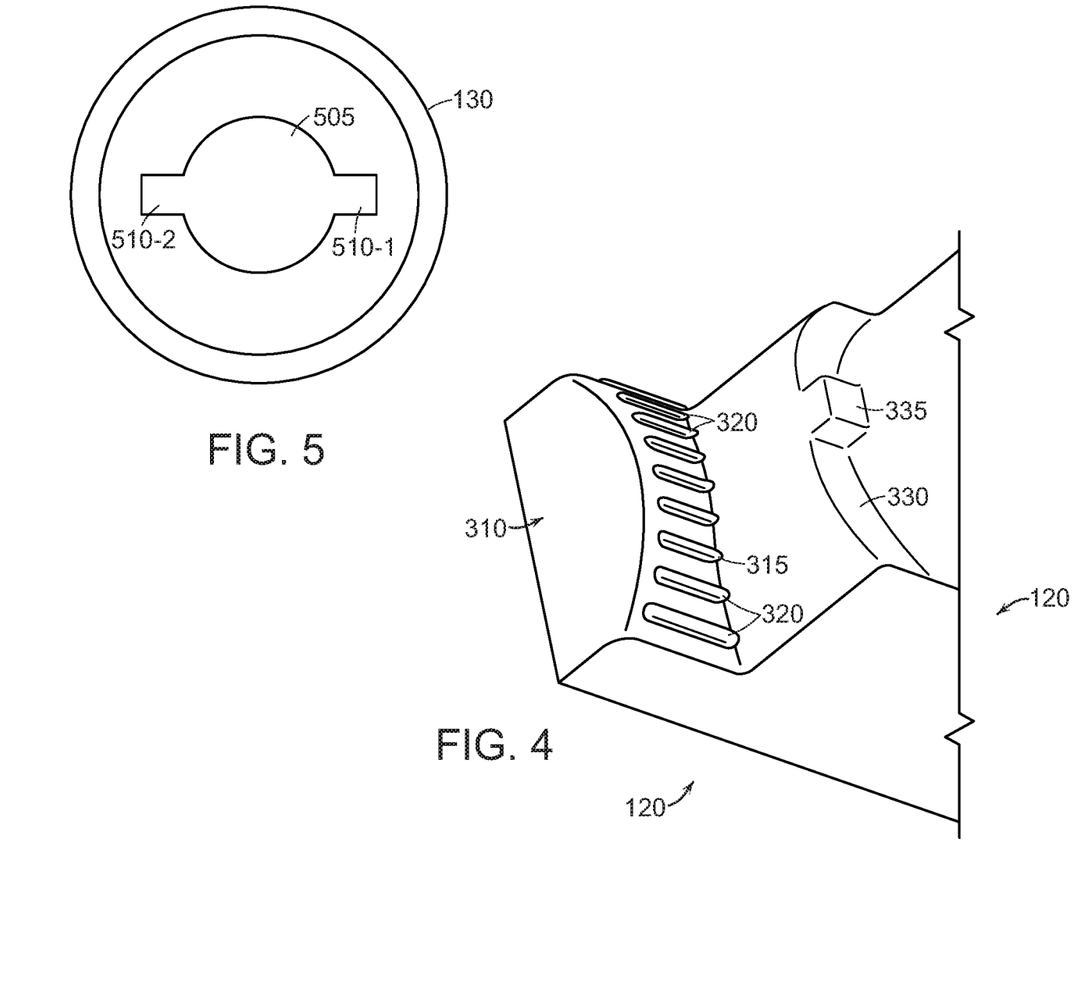
FIG. 4 is a close-up perspective view of a portion of the valve component of FIG. 3.
FIG. 5 is a top view of a seat component of the TPMS module in accordance with an aspect of the present disclosure.

The coupling portion 120 includes, for example, two portions 310-1, 310-2, that extend perpendicularly from the valve 110 with respect to a longitudinal axis of the valve 110, as shown in FIGS. 3 and 4. Each portion 310-1, 310-2 comprises a respective arcuate surface 315-1, 315-2. It should be noted that the portions 310-1, 310-2 may, in one embodiment of the present disclosure, be integrally formed with the coupling portion 120.

A plurality of gripping structures 320, are disposed on, and extend from, each arcuate surface 315-x. In one aspect of the present disclosure, the gripping structures 320 are teeth 320 that are operative as grippers and, in one aspect of the present disclosure, the teeth 320 are linear and arranged parallel to one another. In one embodiment, the teeth 320 are evenly, i.e., equidistantly, distributed or positioned across the arcuate surface 315 although they need not be so positioned. In addition, although a plurality of teeth 320 is shown effectively covering an entire area of the arcuate surface 315, one of ordinary skill in the art will understand that the teeth 320 can be provided on less than all of the area of the arcuate surface 315.

A collar surface 330 is provided adjacent the portions 310-1, 310-2. The collar surface 330 is configured to couple to the collar 130 and includes two keys 335-1, 335-2. The collar surface 330 transfers an axial load that is created when a the grommet 135 is installed. The axial load is transferred from the nut to the surface 330 through the seat 130 and to the valve and reduces the risk of material creep.

Referring to FIG. 5, which is a top view of the seat 130, in one aspect of the present disclosure, an opening 505 is defined therein. A perimeter of the opening 505 includes two notches 510-1, 510-2 that are configured, i.e., arranged, to couple to the two keys 335-1, 335-2, respectively. Accordingly, the seat 130 is configured to couple to the collar surface 330 in a predetermined arrangement. In an alternate embodiment of the present disclosure, the keys 335-1, 335-2 are not provided and the seat 130 then does not include the notches 510-1, 510-2. Still further, only one key 335 and one respective notch 510 may be provided.

Figure 6:
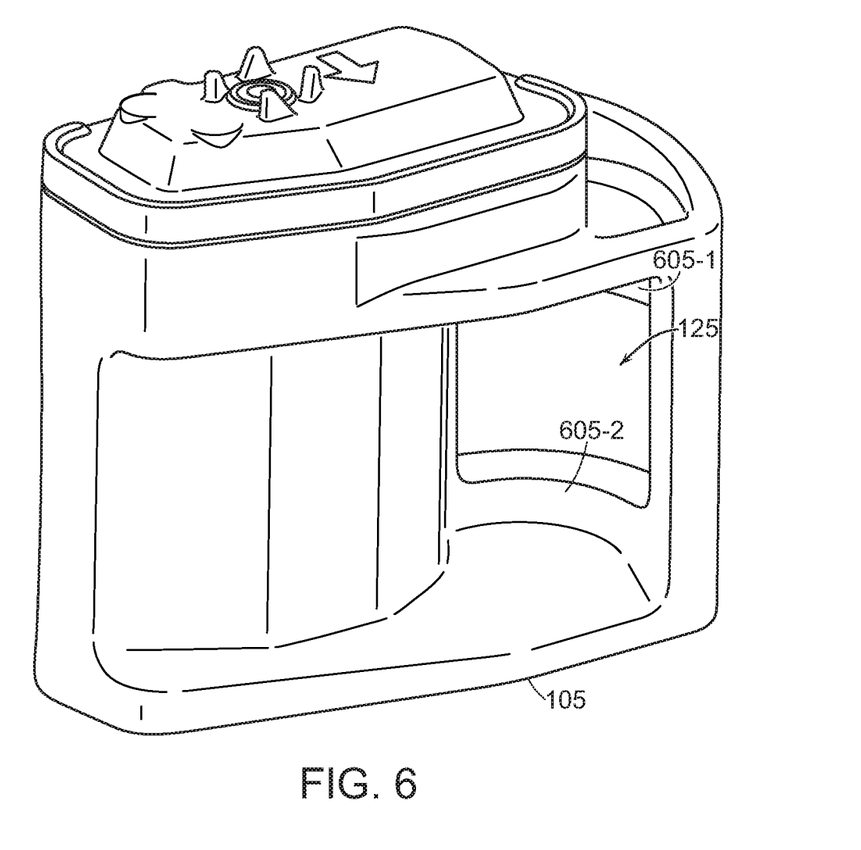
FIG. 6 is a perspective view of a sensor body component of the TPMS module in accordance with an aspect of the present disclosure.
Figure 7:
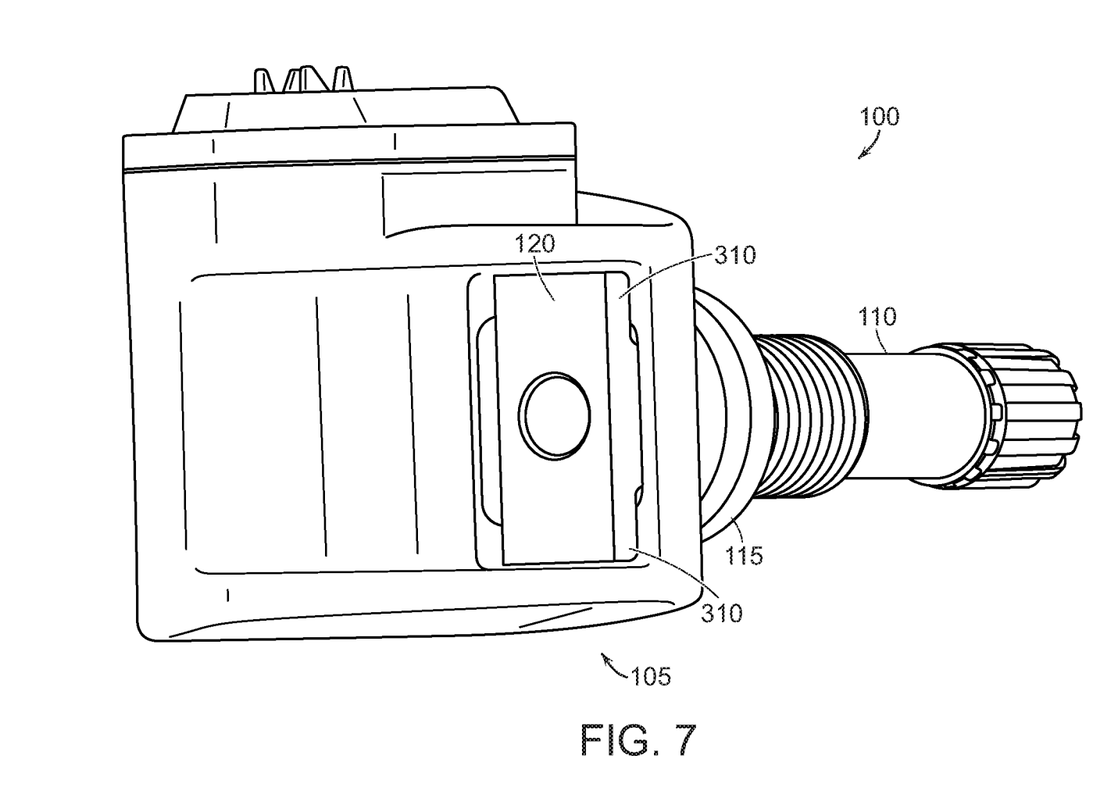
FIG. 7 is a perspective view of the TPMS module of FIG. 1 taken from the direction V as shown in FIG. 2.
Figure 8:
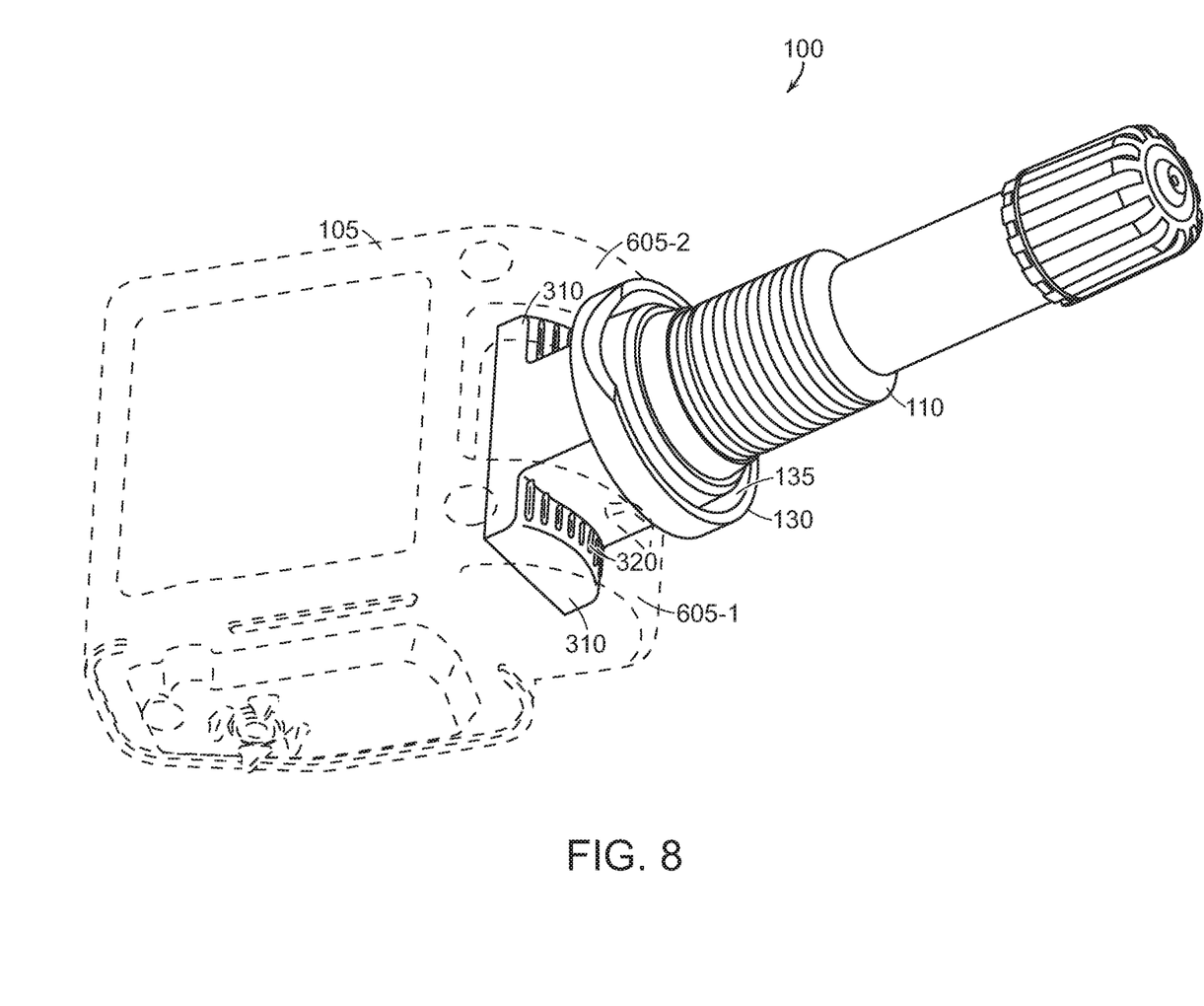
FIG. 8 is a partially transparent perspective view of the TPMS module of FIG. 2.

The sensor body 105 includes two receiving surfaces 605-1, 605-2 adjacent the opening 125 as shown in FIG. 6, a view of the sensor body 105 from a direction V as shown in FIG. 2. The two receiving surfaces 605-1, 605-2 are symmetrically disposed about the opening 125. Each of the receiving surfaces 605-1, 605-2 has an arcuate shape that corresponds to the shape of the arcuate surfaces 315-1, 315-2 on the coupling portion 120. The valve 110 is positioned through the opening 125 and an angle of the valve with respect to the sensor body 105 is set. When the seat 130 and the grommet 135 are then positioned to couple the valve 110 to the sensor body 105, the teeth 320 will bite into, i.e., deforms or displaces the receiving surfaces, in order to engage with the receiving surfaces 605-1, 605-2 to maintain the orientation of the valve 110 to the sensor body 105 when installed in a tire rim, as shown in FIGS. 7 and 8.

It is to be understood that the details of construction and the arrangement of the components set forth in the description, or illustrated in the drawings, are not limiting. There are other ways of being practiced or carried out. Also, it is to be understood that the phraseology and terminology employed herein are for the purpose of description only and also should not be regarded as limiting.

It is appreciated that certain features, which are, for clarity, described in the context of separate implementations, may also be provided in combination in a single implementation. Conversely, various features, which are, for brevity, described in the context of a single implementation, may also be provided separately or in any suitable sub-combination.

While various aspects have been described, it will be apparent to those of ordinary skill in the art that many more embodiments and implementations are possible and are within the scope of this disclosure.

What is claimed is:

1. A tire monitoring module, comprising:
   a sensor body having an opening defined therein and arcuate receiving surfaces provided adjacent the opening;
   a valve comprising:
      a distal portion;
      a coupling portion;
      a plurality of arcuate surfaces provided on the coupling portion; and
      a set of gripping structures disposed on each coupling portion arcuate surface,
   wherein the valve is provided in the sensor body opening and arranged such that the gripping structures couple to the sensor body arcuate receiving surfaces to maintain a fixed relationship of the valve to the sensor body.

2. The tire monitoring module of claim 1, wherein each set of gripping structures comprises a plurality of gripping teeth.

3. The tire monitoring module of claim 2, wherein each gripping tooth in the plurality of gripping teeth comprises a linear protrusion extending from the arcuate surface.

4. The tire monitoring module of claim 3, wherein the linear protrusions on the arcuate surfaces are parallel to one another and are equidistantly distributed across the arcuate surface.

5. The tire monitoring module of claim 1, further comprising:
   a seat; and
   a grommet,
   wherein the seat and the grommet are disposed about the tire valve and positioned to couple the gripping structure to the sensor body arcuate receiving surfaces.

6. The tire monitoring module of claim 5, further comprising:
an opening defined in the seat, wherein the perimeter of the opening includes at least one notch; and
a collar surface provided on the tire valve.

7. The tire monitoring module of claim 5, wherein the grommet is one of:
press-fit around the valve and into the seat;
overmolded around the valve and into the seat; or
stretched around the valve and into the seat.

8. The tire monitoring module of claim 1, wherein a radius of curvature of the sensor body arcuate receiving surfaces and a radius of curvature of the coupling portion arcuate surfaces are the same.

9. The tire monitoring module of claim 1, wherein the gripping structures deform the sensor body arcuate receiving surfaces and engage therewith.

10. The tire monitoring module of claim 1, wherein the sensor body arcuate receiving surfaces comprise:
two arcuate receiving surfaces symmetrically disposed about the sensor body opening.

11. A tire monitoring module, comprising:
a sensor body having an opening defined therein and two arcuate receiving surfaces provided adjacent the opening;
a valve having a distal portion and a coupling portion;
a plurality of opposed arcuate surfaces provided on the coupling portion; and
a plurality of gripping teeth disposed on each coupling portion arcuate surface,
wherein the valve is provided in the sensor body opening and arranged such that the gripping teeth on the coupling portion arcuate surfaces couple to the sensor body arcuate receiving surfaces.

12. The tire monitoring module of claim 11, wherein each gripping tooth in the plurality of gripping teeth comprises a linear protrusion extending from the coupling portion arcuate surface.

13. The tire monitoring module of claim 12, wherein the linear protrusions on the coupling portion arcuate surfaces are parallel to one another.

14. The tire monitoring module of claim 11, wherein a radius of curvature of the sensor body arcuate receiving surfaces and a radius of curvature of the coupling portion arcuate surfaces are the same.

15. The tire monitoring module of claim 14, wherein the gripping teeth are equidistantly distributed across the coupling portion arcuate surface.

16. The tire monitoring module of claim 11, further comprising:
a seat; and
a grommet,
wherein the seat and the grommet are disposed about the tire valve and positioned to couple the gripping teeth to the sensor body arcuate receiving surfaces and to maintain an orientation of the tire valve with respect to the sensor body.

17. The tire monitoring module of claim 16, further comprising:
an opening defined in the seat, wherein the perimeter of the opening includes at least one notch; and
a collar surface provided on the tire valve.

18. The tire monitoring module of claim 17, wherein the grommet is one of:
press-fit around the valve and into the seat;
overmolded around the valve and into the seat; or
stretched around the valve and into the seat.

19. The tire monitoring module of claim 11, wherein the gripping teeth deform the sensor body arcuate receiving surfaces and engage therewith.

20. The tire monitoring module of claim 11, wherein the two sensor body arcuate receiving surfaces are symmetrically disposed about the opening.

* * * * *